(12) United States Patent
Millward

(10) Patent No.: US 10,094,339 B2
(45) Date of Patent: Oct. 9, 2018

(54) DIRECT EXHAUST GAS RECIRCULATION SYSTEM

(71) Applicant: WESTPORT POWER INC., Vancouver (CA)

(72) Inventor: Philip C. Millward, Ann Arbor, MI (US)

(73) Assignee: WESTPORT POWER INC., Vancouver (CA)

( * ) Notice: Subject to any disclaimer, the term of this patent is extended or adjusted under 35 U.S.C. 154(b) by 0 days.

(21) Appl. No.: 14/914,902

(22) PCT Filed: Aug. 26, 2014

(86) PCT No.: PCT/CA2014/050817
§ 371 (c)(1),
(2) Date: Feb. 26, 2016

(87) PCT Pub. No.: WO2015/027335
PCT Pub. Date: Mar. 5, 2015

(65) Prior Publication Data
US 2016/0215736 A1 Jul. 28, 2016

Related U.S. Application Data

(60) Provisional application No. 61/870,203, filed on Aug. 26, 2013.

(51) Int. Cl.
*F02B 33/44* (2006.01)
*F02M 26/43* (2016.01)
(Continued)

(52) U.S. Cl.
CPC .......... *F02M 26/43* (2016.02); *F01N 13/107* (2013.01); *F02B 37/025* (2013.01); *F02M 26/05* (2016.02);
(Continued)

(58) Field of Classification Search
CPC ...... F02M 26/43; F02M 26/05; F02B 37/025; F01N 13/107
(Continued)

(56) References Cited

U.S. PATENT DOCUMENTS 4,179,892 A * 12/1979 Heydrich ................ F02B 37/00
60/605.2
6,220,233 B1 4/2001 Pierpont
(Continued)

FOREIGN PATENT DOCUMENTS

EP 0 869 275 B1 11/2002
JP 2002-089377 A 3/2002
WO 99/60259 A1 11/1999

OTHER PUBLICATIONS

International Search Report, dated Oct. 27, 2014, for PCT/CA2014/050817, 2 pages.
(Continued)

*Primary Examiner* — Ngoc T Nguyen
(74) *Attorney, Agent, or Firm* — Seed Intellectual Property Law Group LLP

(57) ABSTRACT

An improved exhaust gas recirculation (EGR) system comprises combustion chambers divided into a first portion and a second portion. An intake valve and an exhaust valve are associated with each combustion chamber. An intake manifold is in fluid communication with the combustion chambers through respective intake valves. A first exhaust manifold is in fluid communication with said first portion of combustion chambers through respective exhaust valves. A second exhaust manifold is in fluid communication with said second portion of combustion chambers through respective exhaust valves. An EGR exhaust valve is associated with each combustion chamber in said second portion. An EGR manifold is in fluid communication with each combustion
(Continued)

chamber in said second portion through respective EGR exhaust valves and with said at least one intake manifold.

21 Claims, 9 Drawing Sheets

(51) Int. Cl.
    *F02M 26/05*     (2016.01)
    *F02M 26/23*     (2016.01)
    *F02M 35/10*     (2006.01)
    *F01N 13/10*     (2010.01)
    *F02B 37/02*     (2006.01)
    *F02M 26/09*     (2016.01)
    *F02M 26/14*     (2016.01)
    *F02M 26/36*     (2016.01)
    *F02M 26/06*     (2016.01)
    *F02B 29/04*     (2006.01)
    *F02B 37/16*     (2006.01)
    *F02B 37/18*     (2006.01)
    *F02M 26/41*     (2016.01)

(52) U.S. Cl.
    CPC ............ *F02M 26/09* (2016.02); *F02M 26/14* (2016.02); *F02M 26/23* (2016.02); *F02M 26/36* (2016.02); *F02M 35/10222* (2013.01); *F02B 29/0406* (2013.01); *F02B 37/16* (2013.01); *F02B 37/18* (2013.01); *F02M 26/06* (2016.02); *F02M 26/41* (2016.02); *Y02T 10/144* (2013.01)

(58) Field of Classification Search
    USPC .................................................. 60/602, 295
    See application file for complete search history.

(56) References Cited

U.S. PATENT DOCUMENTS

| | | | | |
|---|---|---|---|---|
| 6,347,619 | B1* | 2/2002 | Whiting | F02D 13/0276 123/563 |
| 6,470,864 | B2 | 10/2002 | Kim et al. | |
| 6,508,209 | B1* | 1/2003 | Collier, Jr. | F02B 43/00 123/3 |
| 6,918,251 | B2* | 7/2005 | Yanagisawa | F02B 37/013 123/568.11 |
| 8,783,029 | B2* | 7/2014 | Vigild | F02B 29/0475 123/563 |
| 2003/0000211 | A1* | 1/2003 | Drangel | F01D 17/143 60/602 |
| 2005/0217648 | A1* | 10/2005 | Pagot | F01L 9/00 123/568.14 |
| 2005/0247058 | A1* | 11/2005 | Pedersen | F01D 17/14 60/599 |
| 2008/0092861 | A1* | 4/2008 | Duffy | F01N 3/023 123/568.12 |
| 2008/0295501 | A1* | 12/2008 | Gong | F02M 25/12 60/299 |
| 2010/0024414 | A1* | 2/2010 | Hittle | F02M 26/47 60/602 |
| 2010/0024417 | A1* | 2/2010 | Pierpont | F01N 13/107 60/605.2 |
| 2010/0024419 | A1* | 2/2010 | Pierpont | F01N 13/107 60/624 |
| 2011/0067397 | A1* | 3/2011 | Hirth | F02B 37/025 60/602 |
| 2011/0083641 | A1 | 4/2011 | Gokhale et al. | |
| 2011/0289914 | A1* | 12/2011 | Afjeh | F01N 3/0235 60/602 |
| 2012/0000448 | A1 | 1/2012 | Freund et al. | |
| 2012/0240557 | A1* | 9/2012 | Kawaguchi | F01N 3/2013 60/278 |
| 2014/0326225 | A1* | 11/2014 | Shioda | F02C 6/12 123/559.1 |
| 2014/0331668 | A1* | 11/2014 | Bidner | F02M 26/36 60/605.2 |
| 2014/0356153 | A1* | 12/2014 | Hoshi | F01D 9/026 415/205 |

OTHER PUBLICATIONS

Extended European Search Report dated Jan. 27, 2017, for corresponding EP Application No. 14840876.8-1616 / 3039279, 9 pages.
Office Action, dated Nov. 24, 2017 for Chinese Application No. 2014800471883, 26 pages (with English translation).
Chinese Search Report, dated Nov. 4, 2017 for Chinese Application No. 2014800471883, 6pages (with English translation).
Communication pursuant to Article 94(3) EPC, dated Jan. 5, 2018, for European Application No. 14 840 876.8-1004, 4 pages.

* cited by examiner

DIRECT EXHAUST GAS RECIRCULATION SYSTEM

FIELD OF THE INVENTION

The present application relates to a technique of external exhaust gas recirculation (EGR), and more particularly to high pressure EGR in a turbo charged internal combustion engine.

BACKGROUND OF THE INVENTION

EGR has proven to be an effective technique to reduce nitrous oxide (NOx) emissions by lowering combustion temperatures. The inert exhaust gas displaces oxygen in the combustion chamber and absorbs heat from combustion. The ability to lower combustion temperatures is increased when the recirculated exhaust gases are cooled before being introduced into the combustion chamber. In spark ignited, throttled engines EGR reduces pumping losses by allowing higher intake manifold pressures at lower engine speeds and loads. In external EGR systems, a portion of exhaust gases are recirculated to the intake manifold where they are reintroduced to combustion chambers along with intake air. In a high pressure EGR system the pressure of exhaust gases to be recirculated from the exhaust manifold must be higher than intake manifold pressure. This positive pressure difference between exhaust and intake manifold pressure is not always present throughout the load/speed range of an engine's operation. To enable EGR under these circumstances there are passive and active techniques to achieve the positive pressure difference.

Passive methods include employing passive restrictions that introduce a reduction in the cross-section of the flow geometry. For example, a restriction in the piping in the exhaust system can be employed to raise the back pressure in the exhaust manifold. A restriction can be formed in the exhaust manifold exit before exhaust gases enter a turbocharger, or the restriction can be the entry into the turbocharger itself. By restricting the flow area in such ways the pressure in the exhaust system is increased. Active methods include employing active restrictions, where there is a variable valve to change the cross-sectional flow geometry, and active pumping techniques. For example, an active pumping technique includes feeding exhaust gases upstream of a turbocharger compressor inlet such that they are compressed (pressurized) along with intake air and output to the intake manifold. A direct EGR pumping system employing, for example, a roots-type positive displacement pump is another active technique to increase exhaust gas pressure.

U.S. Pat. No. 4,179,892, issued Dec. 25, 1979 to Hans Heydrich, discloses an exhaust gas recirculation technique for a turbocharged internal combustion engine. The exhaust manifold of the engine is separated into two sections. A first section of the exhaust manifold is directed towards the large scroll of a twin-scroll turbocharger. A second section of the exhaust manifold is split and feeds both the small scroll inlet of the twin-scroll turbocharger and an EGR circuit. To create sufficient back pressure in the EGR circuit the small scroll is designed to provide a restriction of flow into the turbocharger. Since both the EGR circuit and the small scroll inlet of the turbocharger are fed from the same section of the exhaust manifold, the restriction provided by the small scroll inlet must be large enough to create the required back pressure, but an adverse result is that this reduces turbocharger and engine pumping efficiency.

U.S. Pat. No. 6,347,619, issued Feb. 19, 2002 to Whiting et al., discloses an exhaust gas recirculation system for a turbocharged engine. Each cylinder has a primary exhaust valve in fluid communication with an exhaust manifold, and a secondary exhaust valve in fluid communication with an EGR manifold. The EGR manifold is in fluid communication with the intake manifold through either a cold start EGR valve or an EGR cooler/valve combination. The timing of the opening of the secondary exhaust valves is such that the pressure in the EGR manifold is maintained higher than the pressure in the intake manifold. The exhaust manifold is routed to the inlet of a turbocharger. In some engine applications the exhaust valves from different cylinders can be open at the same time, for example overlapping at the end of the power stroke in one cylinder and the end of the exhaust stroke in another cylinder. Since exhaust gases from all the cylinders feed the turbocharger inlet, the exhaust gas flowing from cylinders that fire adjacently interfere with each other thereby reducing turbocharger efficiency.

The state of the art is lacking in techniques for high pressure exhaust gas recirculation systems. There is a need for a method and apparatus for improving high pressure exhaust gas recirculation in turbocharged internal combustion engines.

SUMMARY OF THE INVENTION

An improved exhaust gas recirculation system for an internal combustion engine comprises a plurality of combustion chambers divided into a first portion and a second portion. There is at least one intake valve and at least one exhaust valve associated with each combustion chamber, and at least one intake manifold is in fluid communication with the plurality of combustion chambers through respective intake valves. A first exhaust manifold is in fluid communication with the first portion of combustion chambers through respective exhaust valves, and a second exhaust manifold is in fluid communication with the second portion of combustion chambers through respective exhaust valves. At least one EGR exhaust valve is associated with each combustion chamber in the second portion. An EGR manifold is in fluid communication with each combustion chamber in the second portion through respective EGR exhaust valves and with the at least one intake manifold. In several embodiments there is an EGR cooler and an EGR valve. The EGR cooler fluidly connects the EGR manifold with the EGR valve, and the EGR valve is in fluid communication with the intake manifold.

In a preferred embodiment, there is a turbine-compressor apparatus comprising a turbine and a compressor. The turbine drives the compressor and comprises first and second exhaust inlets. The second exhaust inlet has a smaller flow area than the first exhaust inlet. The first exhaust manifold is in fluid communication with the first exhaust inlet and the second exhaust manifold is in fluid communication with the second exhaust inlet. The intake manifold is in fluid communication with the compressor for receiving a compressed gaseous mixture comprising oxygen.

In various preferred embodiments, there are both active and passive techniques to increase and/or regulate the pressure in the EGR manifold. There can be a restriction in a conduit near an exit of the second exhaust manifold operable to increase the pressure in both the second exhaust manifold and the EGR manifold. Alternatively, or additionally, there can be a pressure regulator between the second exhaust manifold and the first exhaust manifold operable to reduce pressure in the second exhaust manifold and the EGR manifold. Alternatively, or additionally, there can be a pressure regulator in the exhaust flow path after the turbine for varying back pressure in the first exhaust manifold, the second exhaust manifold and the EGR manifold. Alternatively, or additionally, there can be a pressure regulator between the second exhaust manifold and the second exhaust inlet of the turbine. Alternatively, or additionally, there can be a pressure regulator between the EGR manifold and the second exhaust manifold.

In another preferred embodiment, each exhaust valve in respective combustion chambers of the second portion is connected with a variable valve actuation apparatus such that the timing of the exhaust valve can be adjusted to control the pressure in the second exhaust manifold and the EGR manifold.

In another preferred embodiment, there is a reforming catalyst comprising an inlet and an outlet. The inlet is in fluid communication with the EGR manifold for receiving exhaust gases therefrom, and the outlet is in fluid communication with the intake manifold. A fuel injector is configured to introduce gaseous fuel into the exhaust gases upstream of the reforming catalyst.

In another preferred embodiment, the internal combustion engine further comprises a turbine-compressor apparatus that receives exhaust gases from the first and second exhaust manifolds. A charge air cooler is configured to receive compressed air from the turbine-compressor apparatus. There is an adjustable valve regulating the flow of exhaust gases from the EGR manifold to upstream of the charge air cooler where the exhaust gases mix with the compressed air. The mixture is then cooled by the charge air cooler.

An improved method for exhaust gas recirculation in an internal combustion engine comprises dividing combustion chambers in the internal combustion engine into a first portion and a second portion; communicating exhaust gases from the first portion of combustion chambers to a first exhaust manifold; communicating exhaust gases from the second portion of combustion chambers to a second exhaust manifold and an EGR manifold through separate exhaust valves in the combustion chambers; and communicating exhaust gases from the EGR manifold to at least one intake manifold. In a preferred embodiment, the method comprises restricting flow of exhaust gases out of the second exhaust manifold to increase the pressure in the second exhaust manifold and the EGR manifold. Alternatively, or additionally, the method can comprise regulating the pressure between the EGR manifold and an exit of the second exhaust manifold. Alternatively, or additionally, the method can comprise regulating EGR rate by variably actuating exhaust valves to control pressure in the second exhaust manifold.

In a preferred embodiment, the method comprises communicating exhaust gases from the first exhaust manifold to a first turbine inlet; communicating exhaust gases from the second exhaust manifold to a second turbine inlet, the second turbine inlet having a smaller flow area than the first turbine inlet; and compressing a gaseous mixture comprising oxygen with energy imparted to the turbine by the exhaust gases. The method can comprise regulating pressure between the second exhaust manifold and the first exhaust manifold wherein a portion of the exhaust gases in the second exhaust manifold are directed towards the first turbine inlet, which can accommodate a larger flow volume compared to that of the second turbine inlet. Alternatively, or additionally, the method can comprise regulating the pressure between the second exhaust manifold and the second turbine inlet.

In another preferred embodiment, the method comprises introducing a hydrocarbon fuel into the exhaust gases from the EGR manifold forming an exhaust gas-fuel mixture; reforming the exhaust gas-fuel mixture to produce at least hydrogen; and communicating the hydrogen and remaining exhaust gases to the at least one intake manifold. In yet another preferred embodiment, the method comprises compressing intake air with a turbine-compressor apparatus; mixing exhaust gases with the compressed intake air; cooling the mixture of the exhaust gases and the compressed intake air prior to introducing the mixture to the at least one intake manifold.

DETAILED DESCRIPTION OF PREFERRED EMBODIMENT(S)

Figure 1:
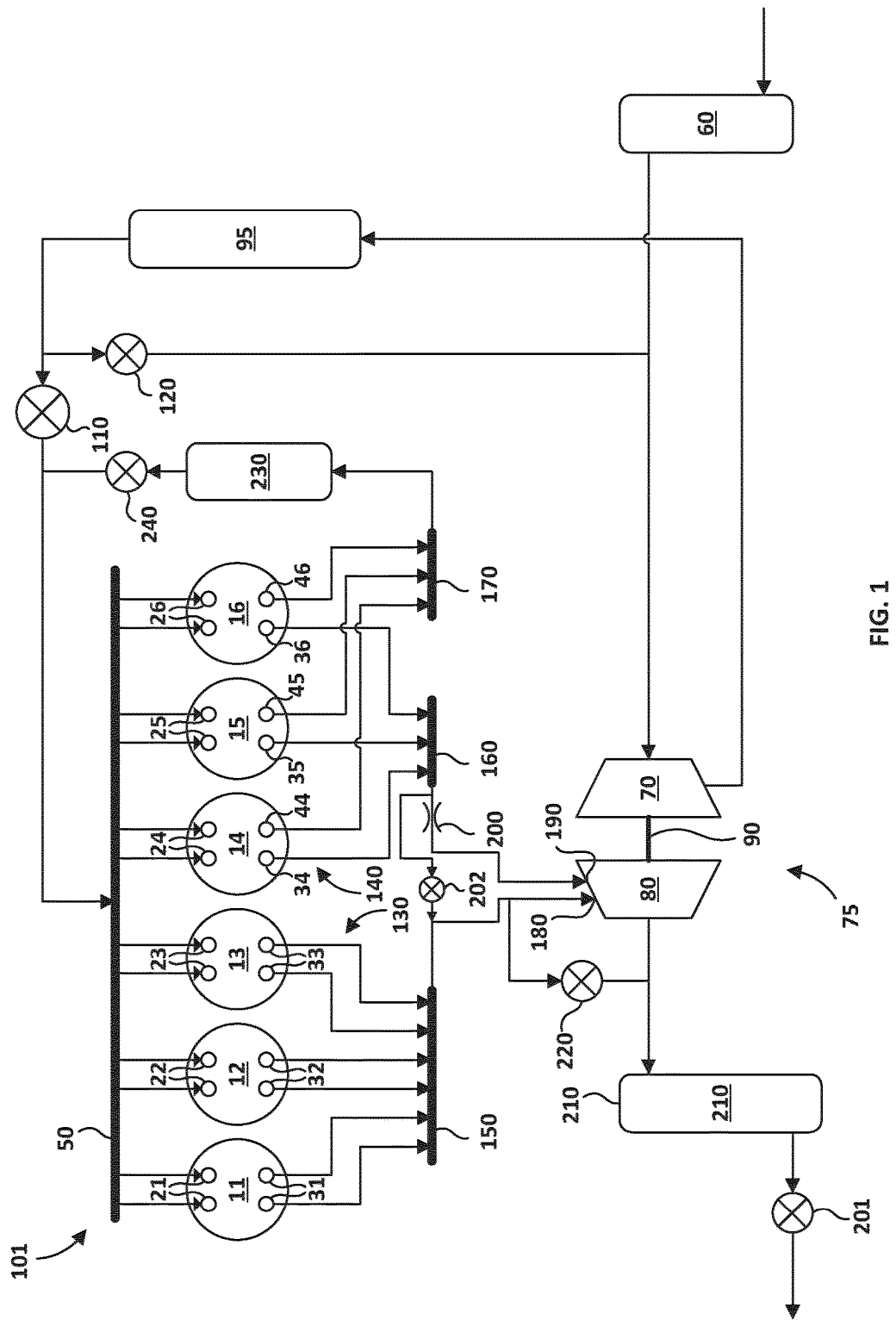
FIG. 1 is a schematic view of an internal combustion engine employing exhaust gas recirculation according to a first embodiment.

The technique of exhaust gas recirculation taught herein can be applied to engines with two or more combustion chambers. Referring to a first embodiment shown in FIG. 1, by way of example, internal combustion engine 101 is illustrated with six combustion chambers 11, 12, 13, 14, 15 and 16. Each combustion chamber has a pair of respective intake valves 21, 22, 23, 24, 25 and 26 operable to permit a mixture comprising air from intake manifold 50 into respective combustion chambers 11, 12, 13, 14, 15 and 16 through respective intake ports. In this disclosure intake ports are represented as lines between intake manifold 50 and respective intake valves 21, 22, 23, 24, 25 and 26. Air is received into engine 101 through air filter 60 and is pressurized by turbine-compressor apparatus 75. Turbine 80 is driven by exhaust gases from the combustion chambers to drive compressor 70 by way of shaft 90. The temperature of the intake air is elevated after compression. Charge air cooler 95 is employed to lower the temperature of the intake air before entry into intake manifold 50 through throttle valve 110. Compressor recirculation valve 120 is operable to recirculate compressed and cooled air from cooler 95 through compressor 70 to protect the compressor from surging/ stalling as throttle valve 110 is adjusted. For example, when throttle valve 110 is suddenly closed, the slug of air from compressor 70 reflects off of valve 110 and returns to the outlet of the compressor which can be damaging. By opening valve 120 because the pressure at the compressor inlet is less than the pressure at the compressor outlet, the slug will return to the inlet to the compressor which is preferable.

Combustion chambers 11, 12, 13, 14, 15 and 16 are divided between first portion 130 comprising chambers 11, 12 and 13, and second portion 140 comprising chambers 14, 15 and 16. Combustion chambers 11, 12 and 13 each comprise a pair of respective exhaust valves 31, 32 and 33 that permit exhaust gases to flow from the combustion chambers to first exhaust manifold 150 through respective exhaust ports. In the illustrative example of this first embodiment each cylinder has a pair of exhaust ports, but in other embodiments combustion chambers 11, 12 and 13 are only required to each have at least one exhaust valve and port. Combustion chambers 14, 15 and 16 comprise respective exhaust valves 34, 35 and 36 that permit exhaust gases to flow from the combustion chambers to second exhaust manifold 160 through respective exhaust ports. In addition, combustion chambers 14, 15 and 16 comprise respective EGR exhaust valves 44, 45 and 46 that permit exhaust gases to flow from the combustion chambers to EGR manifold 170 through respective EGR ports. In this disclosure the exhaust ports are represented as lines between exhaust valves 31, 32, 33, 34, 35 and 36 and their respective exhaust manifolds, and the EGR ports are represented as lines between valves 44, 45 and 46 and manifold 170.

Turbine-compressor unit 75 is a twin-scroll turbocharger in the present embodiment, also known as a divided turbocharger. Turbine 80 comprises large scroll inlet 180 and small scroll inlet 190. In other embodiments a mono-scroll turbine-compressor unit can be employed where both exhaust manifolds 150 and 160 feed a single turbine inlet. Exhaust gases in first exhaust manifold 150 are directed to large scroll inlet 180, and exhaust gases in second exhaust manifold 160 are directed towards small scroll inlet 190. In combination with small scroll inlet 190, restriction 200 in a conduit near the exit of second exhaust manifold 160 increases the backpressure in manifold 160 and in EGR manifold 170 such that the pressure is greater than the pressure in intake manifold 50, as will be described in more detail below. After exiting turbine 80 exhaust gases are directed towards catalyst 210. Wastegate 220 can be opened to allow exhaust gases to bypass turbine 80 directly towards catalyst 210.

Exhaust gases flowing through manifold 170 are directed out of the manifold to EGR cooler 230, in which the temperature of the exhaust gases is reduced. In applications that employ liquefied natural gas (LNG), EGR cooler 230 can comprise a heat exchanger employing the LNG has a heat exchange fluid for removing heat from the exhaust gases, and such removed heat would elevate the temperature of the LNG aiding vaporization. Engine coolant can be employed as the heat exchange fluid if LNG is not available for this purpose. After EGR cooler 230 the exhaust gases are directed through EGR valve 240 towards intake manifold 50. EGR exhaust valves 44, 45 and 46 are operated near the end of power strokes and/or in exhaust strokes of their respective combustion chambers such that the pressure in EGR manifold 170 is higher than the pressure in intake manifold 50. The EGR rate (the proportion of exhaust gases recirculated to intake manifold 50) is dependent upon the pressure difference between second exhaust manifold 160 and EGR manifold 170 when respective exhaust valves 34, 35, and 36 and EGR exhaust valves 44, 45 and 46 are open at the same time. However, the pressure in the combustion chambers for much of the exhaust and EGR valve events is greater than both these pressures, such that there is a positive pressure drive towards EGR manifold 170. That is, combustion chamber pressure PCC, for each combustion chamber 14, 15 and 16, is greater than pressure P160 in second exhaust manifold 160 and pressure P170 in EGR manifold 170 during at least a portion of the valve open events. With the disclosed apparatus and technique, in preferred embodiments, second exhaust manifold has a peak pressure P160 is generally lower than EGR manifold peak pressure P170. Active and/or passive biasing techniques can be employed to increase the pressure in EGR manifold 170 versus P160. For example, restriction 200 at the exit of second exhaust manifold 160 increases the pressure in both manifold 160 and EGR manifold 170. A similar increase in pressure can be obtained by restricting small scroll turbine inlet 190, which can be used in combination with restriction 200. It is beneficial to use a twin-scroll turbocharger since the regular exhaust pulse effects remain, which improves turbocharger efficiency by reducing unwanted pulse interference between exhaust streams from adjacent cylinder fire events. In other embodiments, exhaust valves 34, 35 and 36 and EGR exhaust valves 44, 45 and 46 can employ variable valve actuation to control both lift, duration and base timing of the valves to regulate flow to second exhaust manifold 160 and therefore the pressure to EGR manifold 170. In these embodiments, restriction 200 is not required. For example, in one operational technique exhaust valves 34, 35 and 36 can open early (in their respective cycles) for blow down of exhaust pressure, and EGR exhaust valves 44, 45 and 46 can open later after exhaust gas temperature has decreased. Staged valve opening and closing can be employed, which can allow exhaust valves 34, 35 and 36 to close earlier than EGR exhaust valves 44, 45 and 46, to trap exhaust gases for EGR.

In other embodiments, instead of or in addition to restriction 200 there can be a restriction, or more preferably a pressure regulator in the form of valve 201 with an adjustable flow area in the exhaust path after turbine 80 or after catalyst 210 (shown in FIG. 1) that aids in increasing pressure in EGR manifold 170. The energy in the exhaust gases is reduced after the turbine and after the catalyst, which puts less stress on the valve compared to the stress put on restriction 200. A consequence of this approach is increased back pressure in first exhaust manifold 150 which is not necessarily desirable all of the time. When engine 101 comprises engine brakes then valve 201 can be advantageous to improve engine braking by increasing pumping losses.

In still further embodiments, a pressure regulator in the form of valve 202 with an adjustable flow area can be employed between second exhaust manifold 160 and first exhaust manifold 150. When restriction 200 is employed with valve 202, the valve would connect the exhaust outlet of manifold 160 upstream of restriction 200 to the exhaust outlet of manifold 150. Valve 202 is operable to variably relieve pressure in manifolds 160 and 170 to manifold 150 where large scroll inlet 180 can accommodate large flow volumes.

Figure 2:
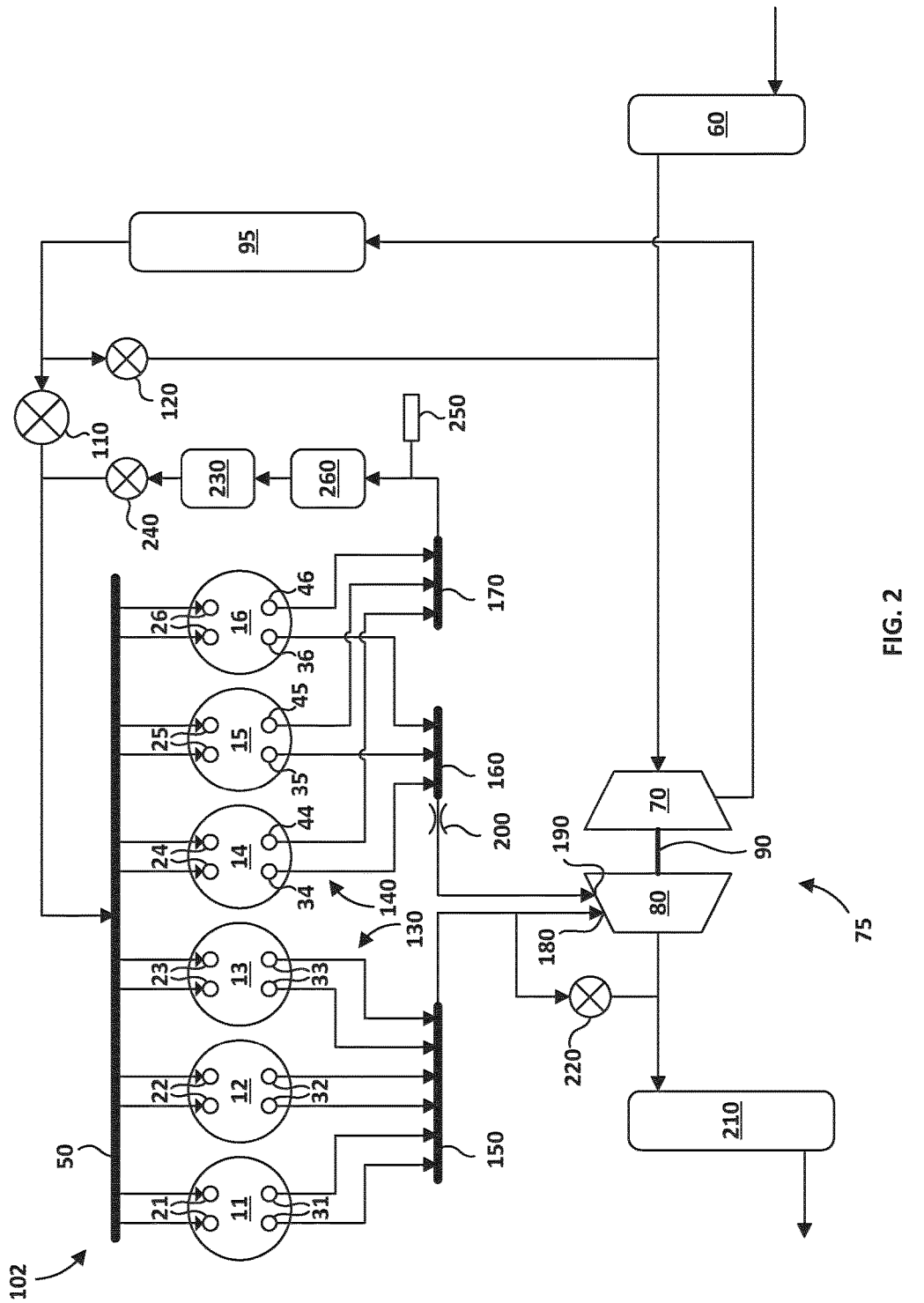
FIG. 2 is a schematic view of an internal combustion engine employing exhaust gas recirculation according to a second embodiment comprising a reforming catalyst in the flow path of recirculated exhaust gases.

Referring now to FIG. 2, engine 102 is illustrated according to a second embodiment, and like parts in this and further embodiments to the first embodiment have like reference numerals and may not be described in detail, if at all. The EGR circuit comprises inline fuel reforming catalyst 260 employed to produce hydrogen ($H_2$) and carbon monoxide (CO) from exhaust gases received from EGR manifold 170, which are used to improve combustion characteristics such as ignitibility and flame speed. Fuel injection apparatus 250 introduces fuel, such as a gaseous fuel mixture comprising methane, although other fuel types can be employed, into the exhaust gases to enrich the EGR mixture prior to reforming catalyst 260. Improvements in the combustion characteristics improve tolerance to EGR mixture and rate variations, and to changes in the fuel quality. Reforming catalyst 260 uses hot water vapor in the exhaust gases and methane fuel sprayed from injection apparatus 250 (in other embodiments other fuels can be employed) and converts them to $H_2$ and CO. The ignitibility and flame speed are improved for the air/fuel/reformed-EGR mixture compared to the air/fuel/non-reformed-EGR mixture. In compression ignition applications, the ignition delay of the fuel air mixture is reduced when $H_2$ is introduced into the combustion chamber.

Figure 3:
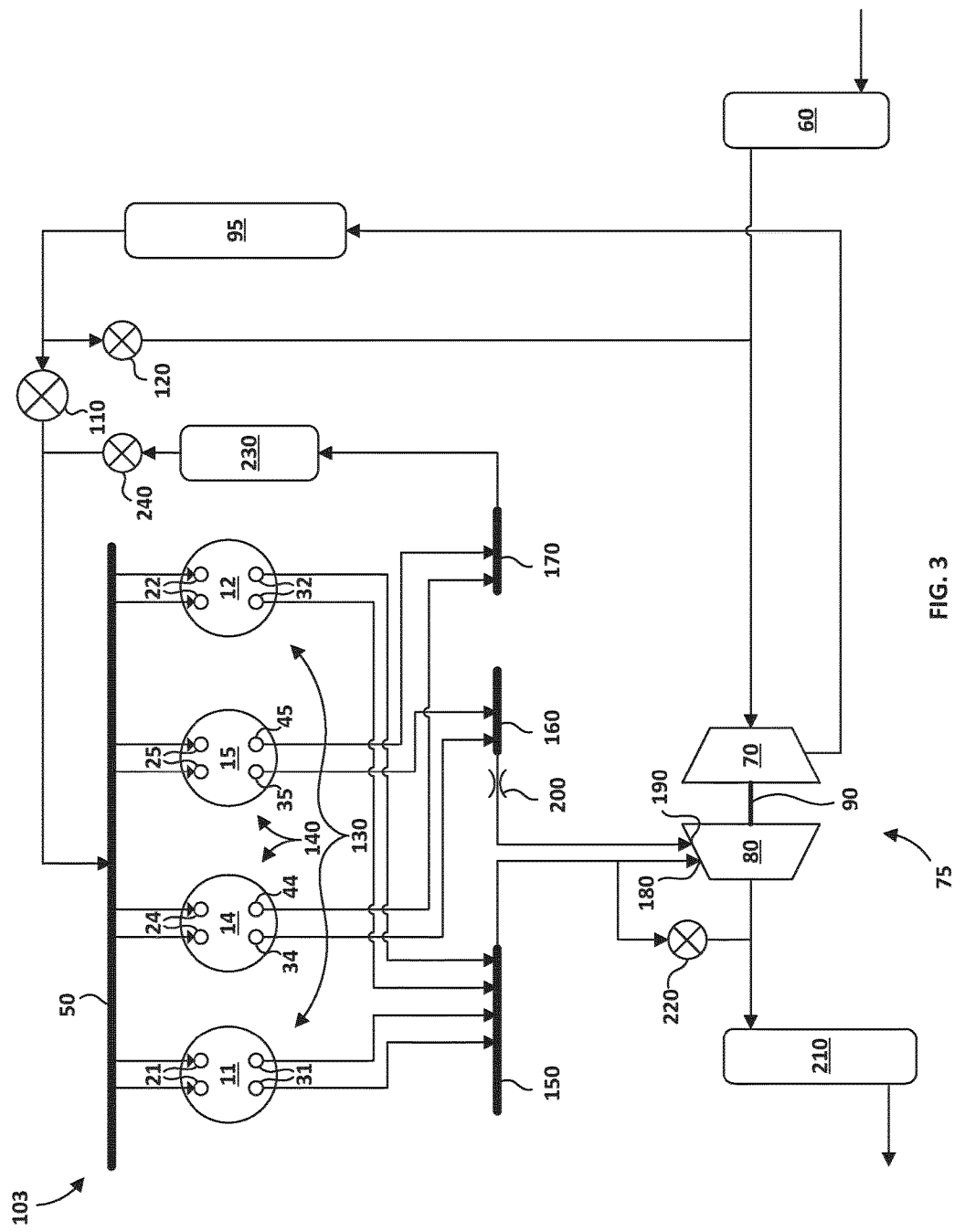
FIG. 3 is a schematic view of a 4-cylinder internal combustion engine employing exhaust gas recirculation according to a third embodiment.

Referring now to FIG. 3, engine 103 is illustrated according to a third embodiment comprising four combustion chambers 11, 12, 14 and 15. This embodiment is different from the embodiment of FIG. 1 in the number of cylinders and routing of the exhaust ports to the manifolds as is illustrated. The typical firing order for a 4-cylinder engine is 1-3-4-2 (cylinder number starting from the right hand side), which in the illustration of engine 103 in FIG. 3 translates to a combustion chamber firing order of: 12, 14, 11 and 15. Each turbine inlet 180 and 190 receives a pulse of exhaust gases from respective exhaust manifolds every 360 degrees. Referring back to FIG. 1, the typical firing order for a 6-cylinder engine is 1-5-3-6-2-4, which in the illustration of engine 101 in FIG. 1 translates to a combustion chamber firing order of: 16, 12, 14, 11, 15 and 13. Accordingly, with the six cylinder embodiment in FIG. 1, each turbine inlet 180 and 190 receives a pulse of exhaust gases from respective exhaust manifolds every 240 degrees. FIG. 3 shows that apart from the described differences between a four cylinder embodiment and a six cylinder embodiment, the remainder of the arrangement and the technique for operation is substantially the same.

Figure 4:
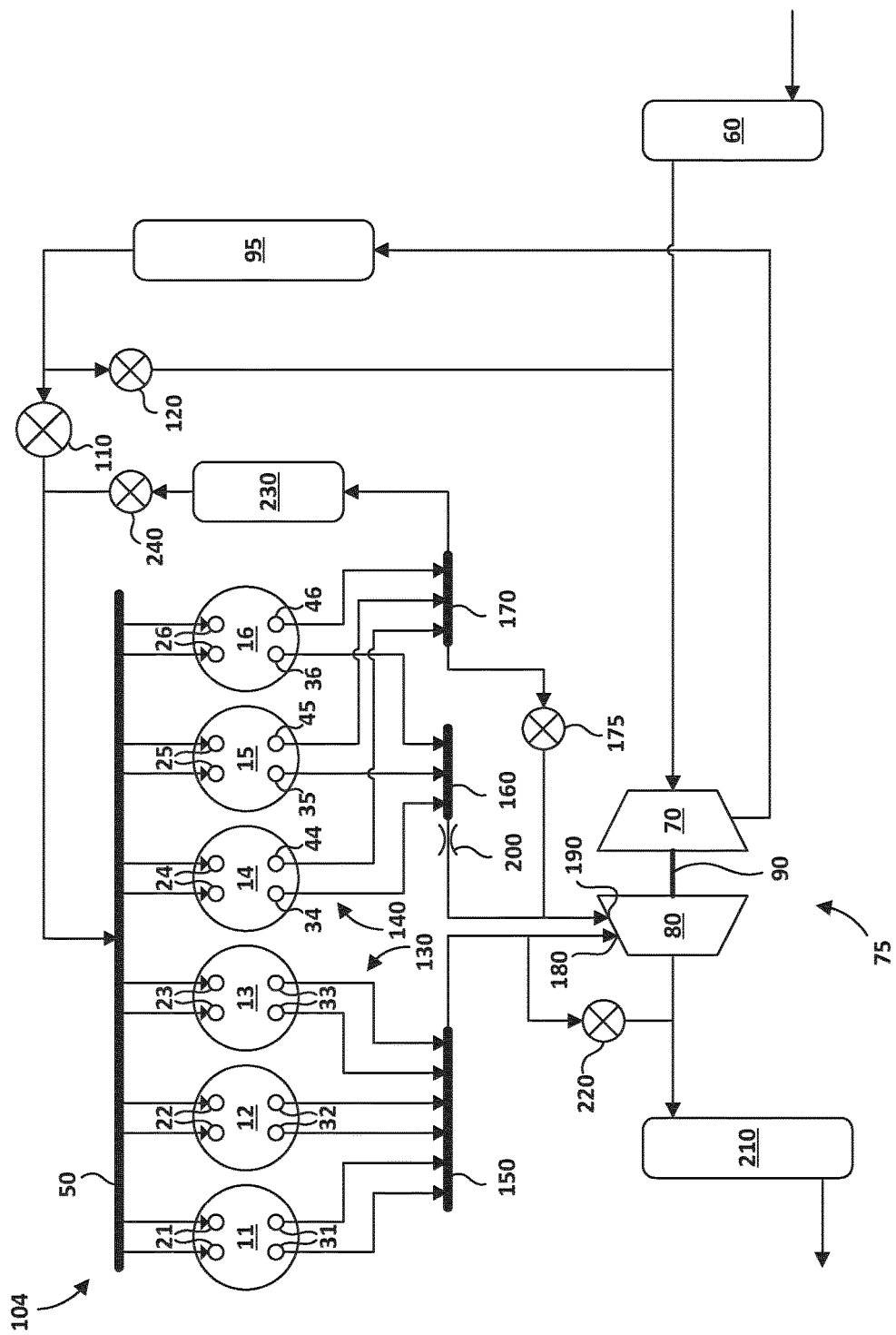
FIG. 4 is a schematic view of an internal combustion engine employing exhaust gas recirculation according to a fourth embodiment comprising a pressure regulator for regulating the pressure between an EGR manifold and downstream of an exhaust manifold exit.

Referring now to FIG. 4, engine 104 is illustrated according to a fourth embodiment comprising pressure regulator 175 for reducing the pressure in EGR manifold 175 to a desired level. Regulator 175 can be a butterfly valve, as well as other types of regulators. Restriction 200 creates back pressure and increases the pressure in EGR manifold 170. Regulator 175 is employed if greater control is desired to drop the pressure in EGR manifold 170 to a desired level. This technique improves EGR rate response and allows the EGR rate to be controlled with improved tolerance and less variation.

Figure 5:
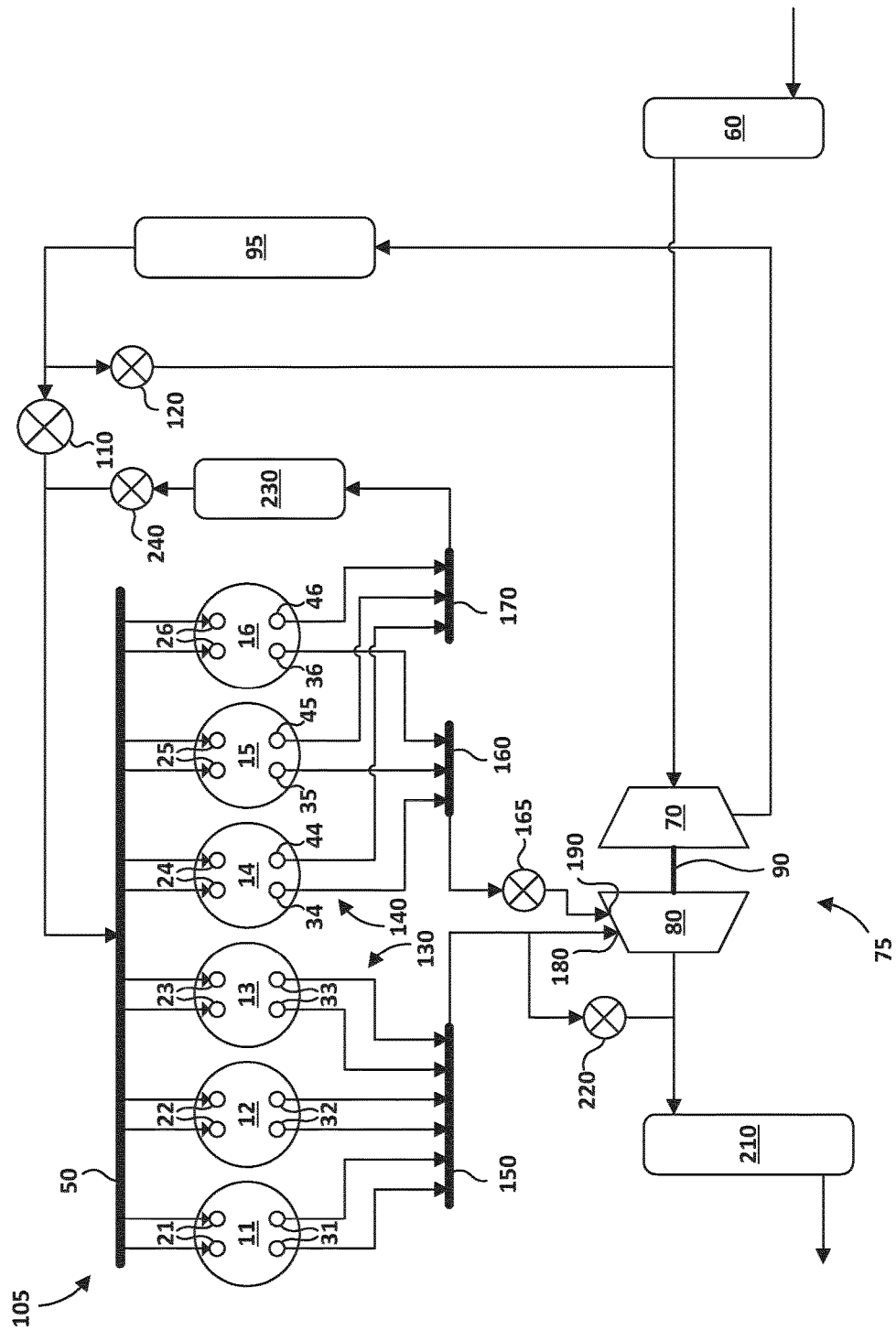
FIG. 5 is a schematic view of an internal combustion engine employing exhaust gas recirculation according to a fifth embodiment comprising a pressure regulator for regulating the pressure between an exhaust manifold and a turbine inlet.

Referring now to FIG. 5, engine 105 is illustrated according to a fifth embodiment comprising pressure regulator 165 for increasing back pressure in the exhaust path and the pressure in EGR manifold 170. Regulator 165 can be a butterfly valve, as well as other types of regulators. Regulator 165 works in conjunction with EGR valve 240 to control the desired EGR rate. The desired opening of each respective valve 165 and 240 is engine speed and load dependent. At low engine speeds EGR valve 240 is typically fully open and valve 165 is partially closed. At high engine speed EGR valve 240 is restricted (compared to low speed) and valve 165 is fully open. In other embodiments, EGR valve 240 is not required such that cooled EGR exhaust gases from cooler 230 are routed directly to intake manifold 50. In these embodiments the EGR flow rate is controlled by pressure regulator 165. Those embodiments without EGR valve 240 are simpler systems, but there is a penalty in terms of EGR rate control and also the response time for engine transient operation, whereas those embodiments that employ both valves 165 and 240 offer more effective EGR rate control.

Figure 6:
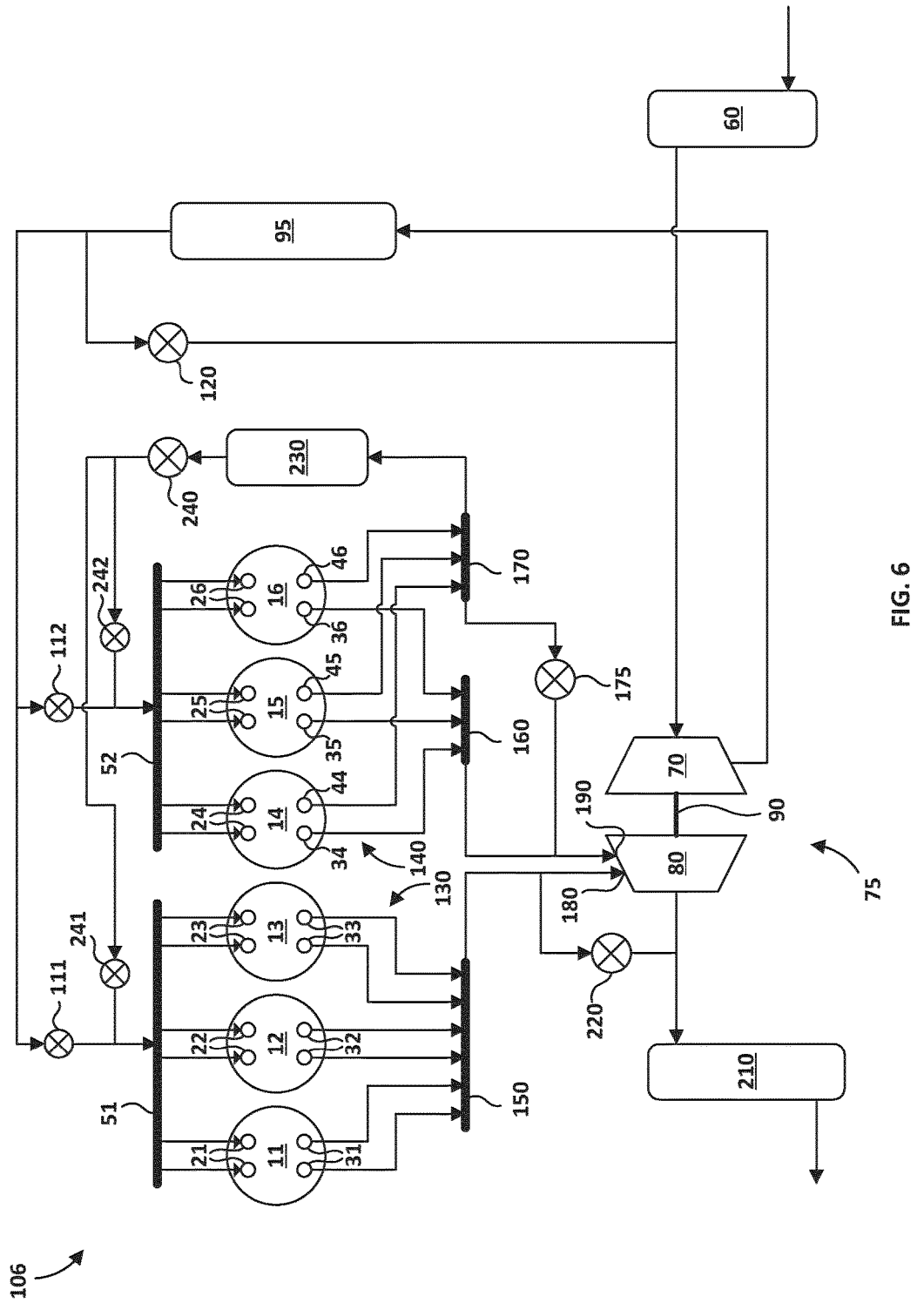
FIG. 6 is a schematic view of an internal combustion engine employing exhaust gas recirculation according to a sixth embodiment comprising a split intake manifold.

Referring now to FIG. 6, engine 106 is illustrated according to a sixth embodiment. The intake manifold is split into section 51 and section 52. Each section has respective throttle valves 111 and 112, and EGR valves 241 and 242. By controlling the respective valves the amount of exhaust gases that flow into intake manifold sections 51 and 52 can be controlled. This is advantageous when engine 106 is operating in a cylinder cut-out mode, for example at low load, where fuel is only introduced into a fraction of the cylinders. When EGR is employed at low load and only combustion chambers 14, 15 and 16 are employed, exhaust gases can be more efficiently routed to these combustion chambers when EGR valve 241 is closed. Although engine 106 is illustrated with pressure regulator 175, the foregoing passive and active techniques to increase the pressure in EGR manifold 170 can be employed in variations of the embodiment of FIG. 6.

Figure 7:
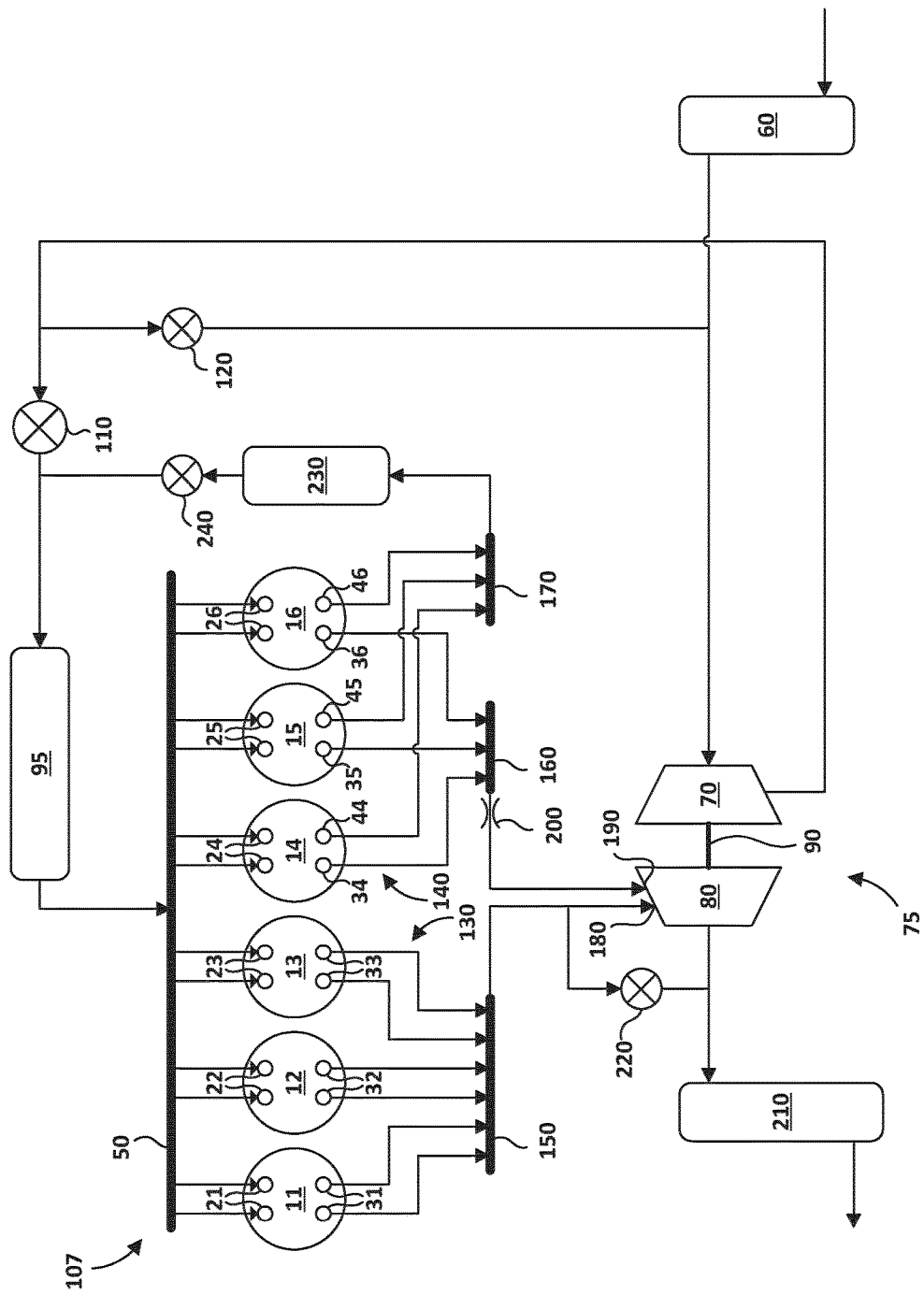
FIG. 7 is a schematic view of an internal combustion engine employing exhaust gas recirculation according to a seventh embodiment where exhaust gases are mixed with compressed intake air prior to the charge cooler.
Figure 8:
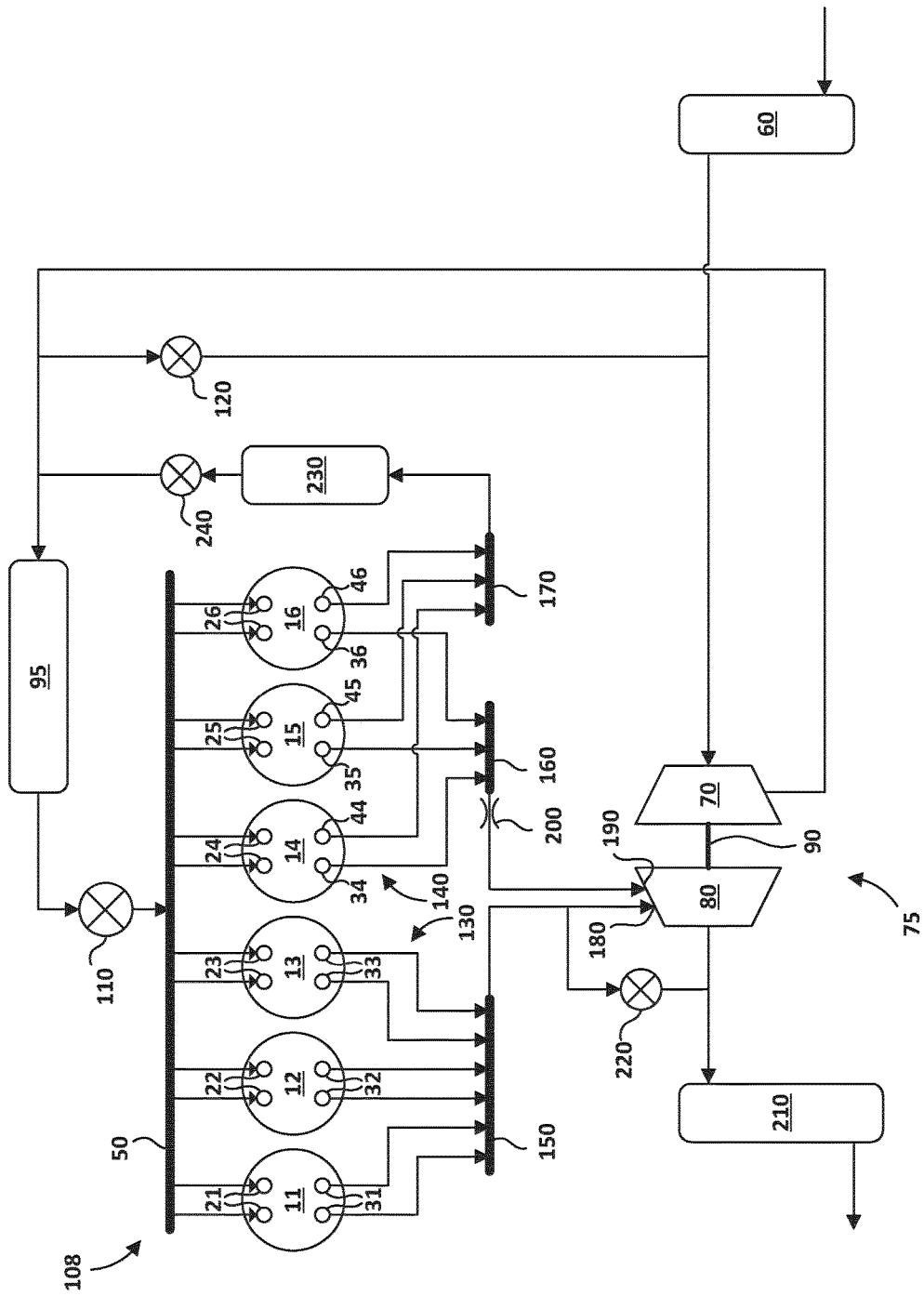
FIG. 8 is a schematic view of an internal combustion engine employing exhaust gas recirculation according to an eighth embodiment similar to the embodiment of FIG. 7 but where the mixture of exhaust gases and intake air is throttled.
Figure 9:
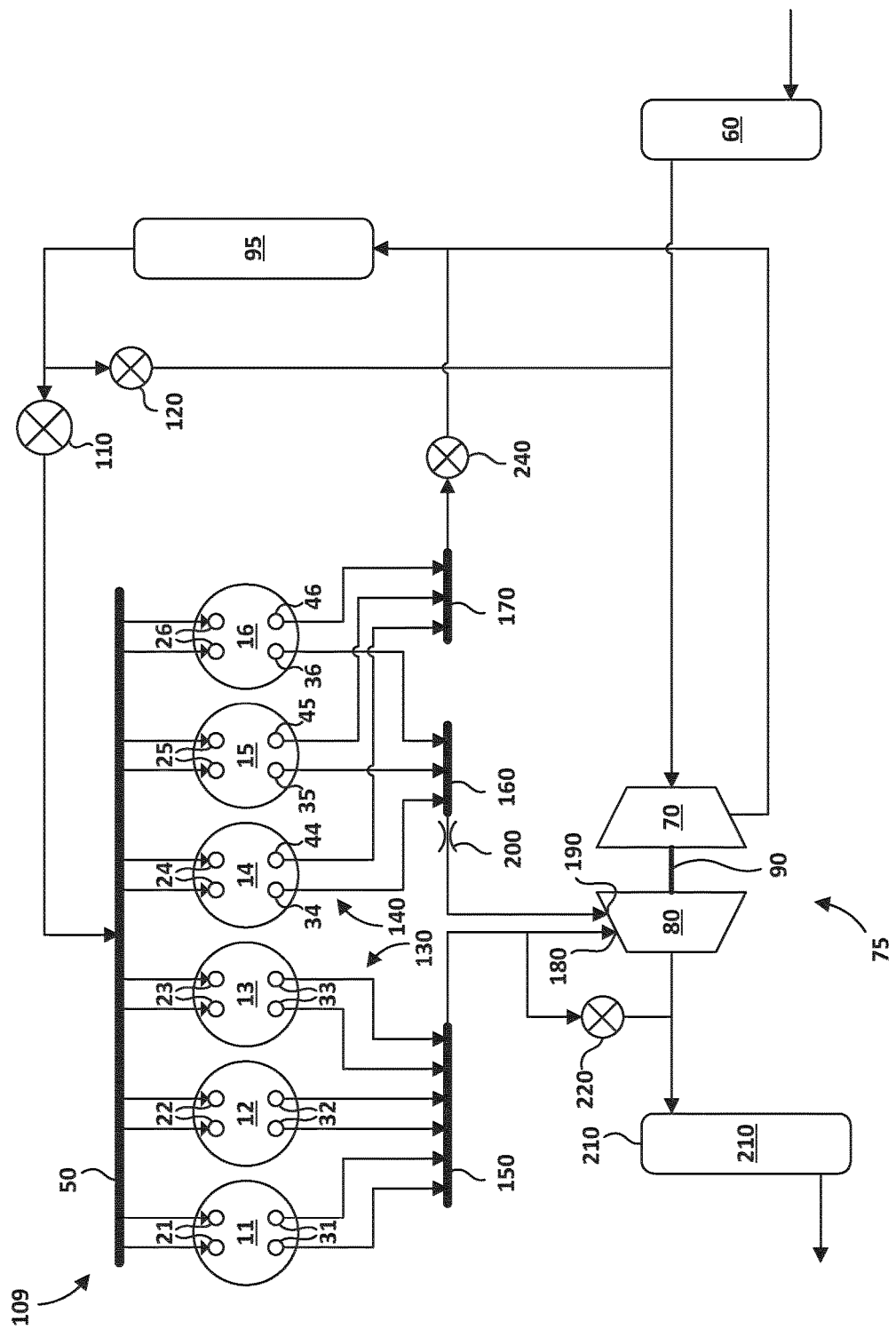
FIG. 9 is a schematic view of an internal combustion engine employing exhaust gas recirculation according to a ninth embodiment where exhaust gases are mixed with compressed intake air prior to a single stage of cooling.

Referring now to FIGS. 7, 8 and 9 engines 107, 108 and 109 are illustrated according to further embodiments where exhaust gases are mixed with compressed intake charge prior to charge air cooler 95. Exhaust gases from these engines have high water vapor content when fuelled with a gaseous fuel such as natural gas, compared to fuelling with petrol. Conventionally, to avoid condensation the exhaust gases had to be kept at a high enough temperature to maintain the water remained as a vapor to avoid potential damage to engine components when condensation occurs (for example, such damage can be caused by acid erosion and droplet impact). This limited how much the exhaust gases could be cooled. The temperature of the charge entering the cylinders was then elevated when mixing the relatively hot post-EGR cooler exhaust gases (~100-150° C.) with the much cooler intake charge (<50° C.). In the present embodiments, when mixing the highly saturated exhaust gases with unsaturated charge air from compressor 70, the dew point of the mixture is lower than the dew point of the exhaust gases alone. When this mixture is communicated through charge air cooler 95 there is consequentially less condensation which allows the exhaust gases to be cooled to a lower temperature. A lower overall charge temperature increases charge density (thereby improving volumetric efficiency) and reduces the potential for pre-ignition and knock. Engines 107 and 108 are similar and differ only in the location of intake throttle 110, where the location of the throttle in engine 108 would allow for improved transient response since the combined mixture is throttled whereas only the intake charge is throttled in engine 107. Engine 107 would have improved EGR concentrations at low load compared to engine 108 since the exhaust gases are mixed with intake charge post-throttle, that is the exhaust gases do not undergo a pressure drop due to the throttle. Engine 109 eliminates EGR cooler 230 and provides a single stage of cooling through charge air cooler 95 (note that cooler 95 can be located post throttle valve 110 in other embodiments similar to FIG. 7 without EGR cooler 230). When cooling the hot exhaust gases through a single stage of cooling the heat exchanger must be able to handle the high temperatures of the exhaust gases. Conventional charge air coolers comprise an aluminum construction, compared to conventional EGR coolers which comprise a stainless steel construction that can tolerate higher temperatures.

One advantage of the foregoing embodiments is that in preferred embodiments the number of exhaust valves associated with the EGR manifold can be chosen to facilitate a targeted EGR rate in the range of approximately 25%, which is an effective rate for combustion stability. Previous EGR systems that employed dedicated cylinders for EGR could achieve this rate for 4-cylinder engines but not for 6-cylinder engines. For example, in 6-cylinder engines the available EGR rates close to 25% would be either 16.6% (1 out of 6 cylinders) or 33.3% (2 out of 6 cylinders). In the previously described embodiments the effective EGR rate is determined by the relative total number of exhaust valves versus EGR exhaust valves and not the number of cylinders, therefore the selection of available EGR rates is more refined in the region needed most. In previous EGR systems employing a fully dedicated EGR manifold receiving exhaust gases from half the cylinders would mean that 50% of exhaust gases could be recirculated. To achieve a 25% EGR rate would require rejecting exhaust gases to the turbine inlet or after the turbine into the catalyst.

Another advantage of the foregoing embodiments is in applications employing an asymmetric twin-scroll turbocharger, where the cylinders have been divided for turbo pulse tuning and where one scroll inlet is restricted to increase the exhaust back pressure to drive EGR. The restriction on the restricted scroll (inlet 190) can be reduced (relative to a conventional asymmetric turbo housing) leading to increased turbo charger efficiency. With staging of exhaust valve events it gives further benefit with blow down and scavenging of exhaust gases.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for exhaust gas recirculation in an internal combustion engine comprising:
   (a) dividing combustion chambers in said internal combustion engine into a first portion and a second portion of combustion chambers, the first portion of combustion chambers having a first plurality of combustion chambers and the second portion of combustion chambers having a second plurality of combustion chambers, each of the first plurality of combustion chambers having first and second exhaust valves, and each of the second plurality of combustion chambers having a third exhaust valve and an EGR exhaust valve;
   (b) communicating exhaust gases from the first plurality of combustion chambers to a first exhaust manifold through said first and second exhaust valves associated with said first plurality of combustion chambers;
   (c) communicating exhaust gases from each combustion chamber of the second plurality of combustion chambers to:
      a second exhaust manifold through said third exhaust valve, and
      an EGR manifold through said EGR exhaust valve, the third exhaust valve being separate from the EGR exhaust valve; and
   (d) communicating exhaust gases from said EGR manifold to at least one intake manifold.

2. The method of claim 1, further comprising:
   (a) restricting flow of exhaust gases out of said second exhaust manifold.

3. The method of claim 1, further comprising:
   (a) communicating exhaust gases from said first exhaust manifold to a first turbine inlet of a turbine;
   (b) communicating exhaust gases from said second exhaust manifold to a second turbine inlet of said turbine, said second turbine inlet having a smaller flow area than said first turbine inlet; and
   (c) compressing a gaseous mixture comprising oxygen with energy imparted to said turbine by said exhaust gases.

4. The method of claim 3, further comprising at least one of:
   (a) regulating pressure between said second exhaust manifold and said first exhaust manifold wherein a portion of said exhaust gases in said second exhaust manifold are directed towards said first turbine inlet; and
   (b) regulating pressure between said second exhaust manifold and said second turbine inlet.

5. The method of claim 4, further comprising:
   (a) regulating pressure between said EGR manifold and said at least one intake manifold.

6. The method of claim 1, further comprising at least one of:
   (a) regulating pressure between said EGR manifold and an exit of said second exhaust manifold; and
   (b) regulating EGR rate by variably actuating said separate second third exhaust valves and said EGR exhaust valves to control pressure in said second exhaust manifold.

7. The method of claim 1, further comprising:
   (a) introducing a hydrocarbon fuel into said exhaust gases from said EGR manifold forming an exhaust gas-fuel mixture;
   (b) reforming said exhaust gas-fuel mixture to produce at least hydrogen; and
   (c) communicating said hydrogen and said exhaust gases to said at least one intake manifold.

8. The method of claim 7, further comprising:
   (a) reforming said exhaust gas-fuel mixture to produce carbon monoxide.

9. The method of claim 1, further comprising:
   (a) compressing intake air with a turbine-compressor unit;
   (b) mixing exhaust gases with said compressed intake air; and
   (c) cooling said mixture of said exhaust gases and said compressed intake air prior to introducing said mixture to said at least one intake manifold.

10. An exhaust gas recirculation (EGR) system for an internal combustion engine comprising:
    (a) a plurality of combustion chambers divided into a first portion of combustion chambers and a second portion of combustion chambers, each of the first portion of combustion chambers having first and second exhaust valves, and each of the second portion of combustion chambers having third and fourth exhaust valves;
    (b) at least one intake valve associated with each combustion chamber;

(c) at least one intake manifold in fluid communication with said plurality of combustion chambers through respective intake valves;

(d) a first exhaust manifold in fluid communication with each combustion chamber of said first portion of combustion chambers through said first and second exhaust valves for receiving exhaust gases;

(e) a second exhaust manifold in fluid communication with each combustion chamber of said second portion of combustion chambers through said third exhaust valve for receiving exhaust gases;

(f) an EGR manifold in fluid communication with each combustion chamber of said second portion of combustion chambers through said fourth exhaust valve for receiving exhaust gases and in fluid communication for supplying exhaust gases with said at least one intake manifold for supplying exhaust gases.

11. The internal combustion engine of claim 10, further comprising:

(a) a turbine-compressor apparatus comprising a turbine and a compressor, said turbine driving said compressor and comprising first and second exhaust inlets, said second exhaust inlet having a smaller flow area than said first exhaust inlet, said first exhaust manifold in fluid communication with said first exhaust inlet and said second exhaust manifold in fluid communication with said second exhaust inlet, said intake manifold in fluid communication with said compressor for receiving a compressed gaseous mixture comprising oxygen.

12. The internal combustion engine of claim 11, further comprising:

(a) a pressure regulator between said second exhaust manifold and said first exhaust manifold operable to reduce pressure in said second exhaust manifold and said EGR manifold.

13. The internal combustion engine of claim 11, further comprising:

(a) a pressure regulator in an exhaust flow path after said turbine for varying back pressure in said first exhaust manifold, said second exhaust manifold and said EGR manifold.

14. The internal combustion engine of claim 11, further comprising:

(a) a pressure regulator between said second exhaust manifold and said second exhaust inlet of said turbine.

15. The internal combustion engine of claim 10, further comprising:

(a) an EGR cooler and an EGR valve, said EGR cooler connecting said EGR manifold with said EGR valve, and said EGR valve in fluid communication with said intake manifold.

16. The internal combustion engine of claim 10, wherein a conduit near an exit of said second exhaust manifold has a restriction therein.

17. The internal combustion engine of claim 10, further comprising:

(a) a pressure regulator between said EGR manifold and said second exhaust manifold.

18. The internal combustion engine of claim 10, wherein each said third exhaust valve in respective combustion chambers of said second portion is connected with a variable valve actuation apparatus.

19. The internal combustion engine of claim 10, further comprising:

(a) a reforming catalyst comprising an inlet and an outlet, said inlet in fluid communication with said EGR manifold for receiving exhaust gases therefrom, said outlet in fluid communication with said intake manifold; and (b) a fuel injector configured to introduce gaseous fuel into said exhaust gases upstream of said reforming catalyst.

20. The internal combustion engine of claim 10, further comprising:

(a) a turbine-compressor unit receiving exhaust gases from said first and second exhaust manifolds;

(b) a charge air cooler receiving compressed air from said turbine-compressor unit; and (c) an adjustable valve between said EGR manifold and upstream of said charge air cooler, wherein said exhaust gases are communicated through said adjustable valve and mixed with said compressed air such that said mixture is cooled by said charge air cooler.

21. An exhaust gas recirculation (EGR) system for an internal combustion engine, said internal combustion engine containing a first plurality of combustion chambers and a second plurality of combustion chambers, each of the first plurality of combustion chambers having first and second exhaust valves associated with said first plurality of combustion chambers, and each of the second plurality of combustion chambers having third and fourth exhaust valves associated with said second plurality of combustion chambers; said exhaust gas recirculation system comprising:

an intake valve associated with each combustion chamber of said first and second plurality of combustion chambers;

an intake manifold in fluid communication with each combustion chamber of said first and second plurality of combustion chambers through respective intake valves;

a first exhaust manifold;

a first exhaust port associated with each first exhaust valve of the first plurality of combustion chambers;

a second exhaust port associated with each second exhaust valve of the first plurality of combustion chambers, respective first and second exhaust ports connecting said first exhaust manifold to respective combustion chambers of said first plurality of combustion chambers;

a third exhaust port associated with each third exhaust valve of the second plurality of combustion chambers;

a fourth exhaust port associated with each fourth exhaust valve of the second plurality of combustion chambers;

a second exhaust manifold connected to each combustion chamber in said second plurality of combustion chambers through said third exhaust port; and an EGR manifold connected to each combustion chamber in said second plurality of combustion chambers through said fourth exhaust port, said EGR manifold in fluid communication with said intake manifold for supplying exhaust gases.

* * * * *